United States Patent [19]

Corcoran, Jr. et al.

[11] Patent Number: 5,120,698
[45] Date of Patent: Jun. 9, 1992

[54] ZINC PHOSPHORUS OXIDE AND ZINC ARSENIC OXIDE COMPOSITIONS

[75] Inventors: Edward W. Corcoran, Jr., Easton, Pa.; Meena Bhalla-Chawla, Gaithersburg, Md.

[73] Assignee: Exxon Research and Engineering Company, Florham Park, N.J.

[21] Appl. No.: 703,314

[22] Filed: May 20, 1991

[51] Int. Cl.$^5$ ............ B01J 23/02; B01J 23/04; B01J 23/06; B01J 37/10
[52] U.S. Cl. .................. 502/164; 502/208; 502/343; 502/226; 502/342; 502/200
[58] Field of Search .......... 502/208, 343, 226, 342, 502/200, 164; 423/306, 312, 622

[56] References Cited

U.S. PATENT DOCUMENTS

| | | | |
|---|---|---|---|
| 4,086,188 | 4/1978 | Reichle | 502/342 X |
| 4,376,709 | 3/1983 | Johnson et al. | 423/602 X |
| 4,827,037 | 5/1989 | Doumaux | 502/208 X |
| 4,841,061 | 6/1989 | Shimasaki et al. | 502/208 X |
| 5,041,406 | 8/1991 | Harley et al. | 502/226 |

Primary Examiner—W. J. Shine
Assistant Examiner—Douglas J. McGinty
Attorney, Agent, or Firm—Joseph J. Dvorak

[57] ABSTRACT

This invention involves a new class of microporous zinc phosphorous oxide and zinc arsenic oxide compositions and method of preparation. The novel compositions have an oxide framework containing zinc and an oxide selected from the group consisting of phosphorous oxides, arsenic oxides and mixtures thereof as the sole lattice constituents specifically the compositions have the formula;

$$[M_a(R_4X)_b]\{[Zn_pO_q][(TO_{4-e})(OH)_e]_yL_f\} \cdot gH_2O$$

where M is selected from the group consisting of H, Li, Na, K, Rb, Cs, Tl, Mg, Ca, Sr, Ba, and mixtures thereof; R is selected from the group consisting of H, alky groups having about 1 to about 8 carbon atoms, preferably about 1 to about 4 carbon atoms, and mixtures thereof; X is selected from the group consisting of N, P, As, and mixtures thereof; T is selected from the group consisting of P, As, and mixtures thereof; L is a halogen, and mixtures thereof; a, b, g, q, f are numerical values of from 0 to 200; p and y are numerical values greater than 0 up to about 200; and e is any numerical value from 0 to 4; provided that, when M is K and y is 2, e is not ½.

19 Claims, No Drawings

ZINC PHOSPHORUS OXIDE AND ZINC ARSENIC OXIDE COMPOSITIONS

FIELD OF THE INVENTION

The invention relates to novel compositions of matter and methods for making them. More particularly, the invention relates to new compositions of matter that are structurally similar to zeolites and which contain zinc in an oxide framework that includes phosphorus or arsenic.

BACKGROUND OF THE INVENTION

Structured, microporous oxides are utilized in a multitude of catalytic and sorption/separation processes in the petroleum and petrochemical industry. The most widely known group of materials falling in this category are the aluminosilicate zeolites. See Breck, D. W., "Zeolite Molecular Sieves", Wiley, N.Y., 1984.

Recently, new microporous materials, such as aluminophosphates, silicoaluminophosphates and metalloaluminophosphates, have been synthesized using an organic templating species. See, Wilson et al., *J. Am. Chem. Soc.*, Vol. 104, p. 1147, 1982; Lok et al., U.S. Pat. No. 4,440,871; and Lok et al., *J. Am. Chem. Soc.*, Vol. 106, p. 6092, 1984. These materials demonstrate two very important factors concerning the synthesis of molecular sieves: (a) that three-dimensional microporous materials can be crystallized from highly acidic reaction media and (b., that sometimes components other than silicon and aluminum will generate porous oxide frameworks. In the case of zinc phosphate phases, however, porous oxide frameworks have not, until now, been generated.

For example, structural studies have been carried out on the zinc phosphate phase $(H_3O)ZnPO_4$. See, Sandomirskii et al., *Dokl. Akad. Nauk SSSR*, Vol. 236(3), pp. 597-600, 1977 and Averbuch-Pouchot, *Acta. Cryst*, Vol. B35, pp. 1452-1454, 1979. Similar studies have been conducted for other zinc phosphate phases; see Kabalov et al., *Dokl. Akad. Nauk SSSR*, Vol. 202(4), pp. 823-826, 1972; Averbuch-Pouchot et al., *Acta. Cryst.*, Vol. C39, pp. 25-26, 1983; Averbuch-Pouchot, *Zeitschrift Fur Kristallographic*, Vol. 171, pp. 113-119, 1985. These zinc phosphate phases all lack any substantial porosity. One indication of this is that these materials are not hydroxylated nor do they contain sorbed water.

It is an object of the present invention, therefore, to make new microporous oxides of zinc and phosphorous or arsenic.

SUMMARY OF THE INVENTION

Briefly stated, this present invention passes a new class of microporous zinc phosphorous oxide and zinc arsenic oxide compositions and method of preparation. The novel compositions have an oxide framework containing zinc and an oxide selected from the group consisting of phosphorous oxides, arsenic oxides and mixtures thereof as the sole lattice constituents specifically the compositions have the formula;

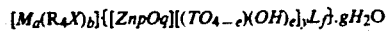

where M is selected from the group consisting of H, Li, Na, K, Rb, Cs, Tl, Mg, Ca, Sr, Ba, and mixtures thereof; R is selected from the group consisting of H, alky groups having about 1 to about 8 carbon atoms, preferably about 1 to about 4 carbon atoms, and mixtures thereof; X is selected from the group consisting to N, P, As, and mixtures thereof; T is selected from the group consisting of P, As, and mixtures thereof; L is a halogen, and mixtures thereof; a,b, g, q, f are numerical values of from 0 to 200; p and y are numerical values greater than 0 up to about 200; and e is any numerical value from 0 to 4; provided that, when M is K and y is 2, e is not ½.

The composition of the present invention are prepared by heating a mixture of a zinc salt, phosphoric or arsenic acid, and a mineralizing or templating agent, at temperatures in the range of from about 50° C. to about 200° C. for a time sufficient to form the compositions.

The compositions of the present invention are useful as catalyst supports, sorption/separation agents and ion exchange materials.

DETAILED DESCRIPTION

A new class of zinc phosphorus oxide and arsenic oxide compositions have been discovered. The compositions have the general formula

where M is selected from the group consisting of H, Li, Na, K, Rb, Cs, Tl, Mg, Ca, Sr, Ba, and mixtures thereof; R is selected from the group consisting of H, alky groups having about 1 to about 8 carbon atoms, preferably about 1 to about 4 carbon atoms, and mixtures thereof; X is selected from the group consisting of N, P, As, and mixtures thereof; T is selected from the group consisting of P, As, and mixtures thereof; L is a halogen, and mixtures thereof; a,b, g, q, and f are numerical values of from 0 to 200, and preferable 0 to 25; p and y are numerical values of greater than 0 up to about 200 and preferably p is 1 to 25 and y is greater than 0 up to 25; and e is any numerical value is not ¼. Particularly preferred are compositions in which: (1) b, g, e and f are 0 and a, p and y are 1; (2) a, b, q, e and f are 0 and p is 3 and y is 2; (3) a is 1, b, q, f and g are 0, e is ½ and y is 2; (4) a, p, e, f and y are 1, b and q are 0 and L is chloride; and (5) p and y are 1, b, q, e and f are 0.

The structure of compositions of the present invention have zinc atoms that are either in a four, five, or six fold coordination environment and phosphorus or arsenic atoms that are in a tetrahedral environment with oxygen atoms. In other words, the compositions have oxide frameworks containing zinc and phosphorous oxide or arsenic oxide as the only lattice constituents. In certain cases, e.g. when the framework is charged, a charge compensating cation or anion may also be present. The charge-compensating cations include M and $R_{4x}$ groups mentioned previously. Compensating anions include halides, especially chloride, bromide and iodide. In any event, these compositions are microporous, meta stable phases that structurally resemble zeolites.

In order to prepare the compositions of the present invention, zinc salt, preferably selected from the group consisting of zinc halides, sulfates, oxides, hydroxides, nitrates, and mixtures thereof and more preferably selected zinc dichloride is dissolved in water, and preferably distilled water. An aqueous solution of phosphoric acid or arsenic acid is slowly added at room temperature to the zinc salt solution to form a reaction mixture. Preferably the ratio of zinc:phosphorous or zinc:arsenic in the reaction mixture is variable over a range from about 0.001 to about 1000 and most preferably from about 0.01 to about 100.

Next, either a templating agent or mineralizing agent is added to the reaction mixture. Typically the agent added will be any of those used in the synthesis of conventional aluminosilicate zeolites. Preferred templating agents are selected from the group consisting of organic ammonium salts, organic amines, quaternary phosphonium, and arsonium salts, and mixtures thereof; more preferred are tripropylamine, tetramethylammonium hydroxide, tetrapropylammonium hydroxide and mixtures thereof. Typical mineralizing agents are selected from the group consisting of alkali and alkaline earth metal halides, hydroxides, and mixtures thereof. Preferred mineralizing agents are potassium hydroxide, rubidium hydroxide, cesium hydroxide, and mixtures thereof.

The ratio of zinc:templating agent or zinc:mineralizing agent ranges from about 0.001 to about 1000.

Although the reagents of the reaction mixture may be combined in vz:rying order, the order in which they are combined will effect the structure and in some instances, the composition of the crystalline material produced. In a preferred embodiment, the acid is added to the zinc salt first and the templating agent or mineralizing agent second. The resulting reaction mixture will have a consistency ranging from that characteristic of a clear non-viscous solution to that characteristic of a viscous gel.

In conducting the hydrothermal synthesis, the reaction mixture is placed in a sealed pressure vessel, preferably lined with an inert material, such as polytertrafluoroethylene; and the mixture is then heated, preferably under autogenous pressure, at a temperature between about 50° C. and about 280° C, for a time sufficient to produce crystals of the product. In general, the heating is carried out for a time of from about 1 hour to about 30 days, and more preferably from about 2 hours to about 14 days. The product is recovered by any convenient method such as decantation or filtration. The recovered solid generally is washed with water and dried at 100° C.

The compositions produced in accordance with the present invention generally have a high crystallinity and particle sizes ranging from sub-micron particles to larger optically visible particles. High yields of pure phase products often result.

Also, the compositions of the present invention exhibit cation-exchange capability when analyzed using ion-exchange techniques employed with zeolitic aluminosilicates. Also, as indicated previously the products have microporous structures suitable for use in sorption/separation process.

The following examples will further illustrate the instant invention.

EXAMPLE 1

Preparation and Structural Characterization of KZnPO₄

9.61 g of zinc dichloride was dissolved in 10.0 g of distilled water then 8.13 g of 85% phosphoric acid was added. The solution was stirred thoroughly. A second solution, prepared by dissolving 13.8 g of potassium hydroxide in 8.0 g of distilled water, was combined with the first solution, at room temperature, to form a reaction mixture. Distilled water was added to bring the final weight of the mixture to 50.0 g. The mixture was stirred thoroughly and developed the consistency of a homogeneous, milky, gel. The mixture was heated in a polytetrafluoroethylene-lined autoclave for nine days at 200° C. and a white crystalline solid product formed. After the autoclave was brought to room temperature, the product was recovered, washed with distilled water, filtered, and dried at 100° C. The characteristic powder x-ray diffraction pattern for the product is shown in Table 1. The the crystalline phase structure of the product was determined by single crystal x-ray diffraction and the crystallographic data in Table 2.

TABLE 1

| 2Theta | d | Integ. I (%) |
|---|---|---|
| 14.234 | 6.21 | 8.4 |
| 19.53 | 4.54 | 11.8 |
| 20.87 | 4.25 | 100 |
| 22.16 | 4.01 | 9.4 |
| 28.01 | 3.18 | 18.4 |
| 28.72 | 3.11 | 48.7 |
| 33.08 | 2.71 | 6.1 |
| 34.17 | 2.62 | 41.4 |
| 35.80 | 2.51 | 5.4 |
| 37.34 | 2.41 | 7.8 |
| 41.22 | 2.19 | 7.2 |
| 42.48 | 2.13 | 53.3 |

As will be understood by those skilled in the art the determination of the parameter 2 Theta, irrespective of the technique employed, is subject to both human and mechanical error, which in combination, can impose an uncertainty of about 0.4" on each reported value of 2 Theta. This uncertainty is of course, also manifested in the reported value of the d-spacings, which are calculated from the 2 Theta values. This imprecision is general throughout the art and is not sufficient to preclude the differentiation of the present crystalline materials from the compositions of the prior art.

TABLE 2

Single Crystal Diffraction Data - KZnPO₄
[Crystal System: Hexagonal. Space Group P6₃ (No. 173)
a = b = 10.473Å, c = 8.502Å] alpha = beta = 90°,
gamma = 120°

| Atom | x | y | z |
|---|---|---|---|
| Zn1 | 0.6667 | 0.3333 | 0.0000 |
| Zn2 | 0.3266 | 0.1577 | 0.3751 |
| K1 | 0.5204 | 0.0417 | −0.3128 |
| K2 | 0.0000 | 0.0000 | 0.0000 |
| P1 | 0.6667 | 0.3333 | 0.3967 |
| P2 | 0.3285 | 0.1588 | −0.0113 |
| O1 | 0.6667 | 0.3333 | 0.2196 |
| O2 | 0.4751 | 0.1830 | −0.0750 |
| O3 | 0.5156 | 0.3021 | 0.4594 |
| O4 | 0.3190 | 0.0923 | 0.1598 |
| O5 | 0.2879 | −0.0256 | 0.4953 |
| O6 | 0.1736 | 0.2007 | 0.4141 |

EXAMPLE 2

Preparation and Structural Characterization of RbZn₂(PO₄)(HPO₄)

19.2 g of zinc dichloride was dissolved in 10.0 g of distilled water than 16.3 g of 85% phosphoric acid was added. The solutin was stirred thoroughly. Next, 50.4 g of 50% aqueous rubidium hydroxide was added dropwise while the solution was stirred (exothermic) to form a reaction mixture which had the consistency of a homogeneous gel. The mixture was heated in a polytetrafluoroethylene-lined autoclave for 5 days at 200° C. and a white crystalline solid porduct formed. After the autoclave was brought to room temperature, the product was recovered, washed with distilled water, filtered and dried at 100° C. The characteristic powder x-ray diffraction pattern for the product is shown in Table 3. the Crystalline phase structure of the product was determined by single crystal x-ray diffraction and the crystallographic data in Table 4.

TABLE 3

| 2Theta | d | Integ. I (%) |
|---|---|---|
| 9.53 | 9.27 | 100 |
| 15.60 | 5.68 | 57.3 |
| 19.12 | 4.64 | 69.0 |
| 19.68 | 4.44 | 10.7 |
| 21.27 | 4.18 | 57.6 |
| 22.75 | 3.91 | 6.5 |
| 23.34 | 3.81 | 10.4 |
| 23.69 | 3.75 | 38.5 |
| 24.05 | 3.70 | 6.0 |
| 25.04 | 3.55 | 5.6 |
| 28.29 | 3.15 | 20.6 |
| 28.84 | 3.09 | 54.4 |
| 29.51 | 3.02 | 5.1 |
| 29.84 | 2.99 | 7.6 |
| 31.65 | 2.82 | 76.4 |
| 32.40 | 2.76 | 12.6 |
| 32.80 | 2.73 | 6.4 |
| 34.12 | 2.63 | 11.7 |
| 35.32 | 2.54 | 6.8 |
| 37.52 | 2.40 | 5.4 |
| 38.79 | 2.32 | 30.7 |
| 40.52 | 2.23 | 5.5 |
| 41.09 | 2.20 | 7.1 |
| 42.41 | 2.13 | 65.7 |
| 46.41 | 1.96 | 20.5 |
| 47.42 | 1.92 | 6.0 |
| 48.48 | 1.88 | 8.7 |
| 49.05 | 1.86 | 6.3 |
| 49.59 | 1.84 | 6.7 |

TABLE 4

Single Crystal Diffraction Data - $RbZn_2(PO_4)(HPO_4)$
Crystal System: Triclinic, Space Group P1 (No. 2)
a = 5.248Å, b = 8.892Å, c = 9.702Å
alpha = 75.72°, beta = 77.43°, gamma = 73.68°

| Atom | x | y | z |
|---|---|---|---|
| Rb | 0.7112 | 0.7036 | 0.3233 |
| Zn1 | 0.3889 | 0.3850 | 0.2284 |
| Zn2 | 0.1966 | 0.1119 | 0.1102 |
| P1 | 0.3293 | 0.7560 | 0.0503 |
| P2 | −0.1056 | 0.2478 | 0.3884 |
| O11 | 0.4233 | 0.5979 | 0.1504 |
| O12 | 0.5293 | 0.7637 | −0.0955 |
| O13 | 0.3568 | 0.8890 | 0.1164 |
| O14 | 0.0451 | 0.7770 | 0.0236 |
| O21 | 0.0246 | 0.3860 | 0.3268 |
| O22 | 0.0331 | 0.1049 | 0.3142 |
| O23 | −0.4067 | 0.3007 | 0.3862 |
| O24 | −0.0689 | 0.1929 | 0.5516 |
| H24 | −0.0618 | 0.1069 | 0.5786 |

EXAMPLE 3

Preparation and Structural Characterization of $Zn_3(PO_4)_2 \cdot H_2O$ 9.4 g of zinc dichloride was dissolved in 20.0 g of distilled water then 8.0 g of 85% phosphoric acid was added. The solution was stirred thoroughly. Next, 10.9 g of tripropylamine was added while the solution was slowly stirred to form a reaction mixture. Distilled water was added to bring the final weight of the mixture to 50.0 g. The mixture was stirred and developed the consistency of a gel. The mixture was then heated in a polytetrafluoroethylene-lined autoclave for 5 days at 200° C. and a white crystalline solid product formed. After the autoclave was brought to room temperature, the product was recovered, washed with distilled water, filtered and dried at 100° C. The characteristic powder x-ray diffraction pattern for the product is shown in Table 5. The crystalline phase structure of the product was determined by single crystal x-ray diffraction and the crystallographic data in Table 6.

TABLE 5

| 2Theta | d | Integ. I (%) |
|---|---|---|
| 10.61 | 8.33 | 25.9 |
| 10.92 | 8.10 | 11.4 |
| 14.32 | 6.22 | 0.5 |
| 15.51 | 5.71 | 0.7 |
| 22.20 | 4.00 | 1.8 |
| 24.50 | 3.63 | 26.0 |
| 28.24 | 3.16 | 1.1 |
| 29.06 | 3.07 | 0.9 |
| 29.45 | 3.03 | 2.3 |
| 30.33 | 2.94 | 7.2 |
| 30.93 | 2.89 | 0.8 |
| 31.10 | 2.87 | 0.6 |
| 32.00 | 2.79 | 6.1 |
| 36.13 | 2.48 | 0.6 |
| 37.00 | 2.43 | 21.0 |
| 38.35 | 2.34 | 1.7 |
| 39.36 | 2.29 | 0.6 |
| 39.51 | 2.28 | 46.5 |
| 43.82 | 2.06 | 0.5 |
| 46.32 | 1.96 | 1.1 |
| 46.67 | 1.95 | 100 |
| 47.25 | 1.92 | 77.1 |
| 48.05 | 1.89 | 2.2 |

TABLE 6

Single Crystal Diffraction Data - $Zn_3(PO_4)_2 \cdot H_2O$
Crystal System: Monoclinic, Space Group $P2_1/c$ (No. 14)
a = 8.686Å, b = 4.887Å, c = 16.676Å
alpha = gamma = 90°, beta = 94.97°

| Atom | x | y | z |
|---|---|---|---|
| Zn1 | 0.4193 | 0.9951 | 0.3195 |
| Zn2 | 0.0642 | 0.7012 | 0.3454 |
| Zn3 | 0.1715 | 0.7989 | 0.0552 |
| P1 | 0.2635 | 0.5109 | 0.2169 |
| P2 | 0.1817 | 0.2065 | 0.4439 |
| O11 | 0.4066 | 0.3320 | 0.2417 |
| O12 | 0.2421 | 0.7361 | 0.2819 |
| O13 | 0.3053 | 0.6575 | 0.1402 |
| O14 | 0.1162 | 0.3458 | 0.2091 |
| O21 | 0.0356 | 0.3525 | 0.4027 |
| O22 | 0.1362 | −0.1018 | 0.4505 |
| O23 | 0.3141 | 0.2432 | 0.3927 |
| O24 | 0.2177 | 0.3243 | 0.5283 |
| O99 | 0.4704 | 0.7328 | 0.4174 |
| H1 | 0.0446 | 0.0597 | 0.0420 |
| H2 | 0.0549 | 0.0728 | 0.0418 |

EXAMPLE 4

Preparation of $Zn_3(PO_4)_2 \cdot H_2O$ 15.8 g of zinc dichloride was dissolved in 10.0 g of distilled water then 13.3 g of 85% phosphoric acid was added. The solution was stirred thoroughly. A second solution prepared by combining 21.1 g of 25% aqueous tettramethylammonium hydroxide with 37.5 g of 40% aqueous tetraburylammonium hydroxide, was slowly added to the first solution to form a reaction mixture. Distilled water was added to bring the final weight of the mixture to 100.0 g. The mixture was then stirred and developed the consistency of a homogeneous gel. The mixture was heated in a polytetrafluoroethylene-lined autoclave for 5 days at 200° C. and a white crystalline solid product formed. After the autoclave was brought to room temperature, the product was recovered, washed with distilled water, filtered and dried at 100° C. The characteristic x-ray diffraction pattern for the product was the same as that shown in Example 3.

EXAMPLE 5

Preparation of $Zn_3(PO_4)_2 \cdot H_2O$ 16.7 g of zinc dichloride was added to 14.1 g 85% phosphoric acid and stirred to form an inhomogeneous solution. Next, 68.4 g of 40% aqueous tetrapropylammonium hydroxide was slowly added to the solution to form a reaction mixture having the consistency of a clear solution. The mixture was stirred and heated in a polytetrafluoroethylene-lined autoclave for 6 days at 200° C. and a white crystalline solid product formed. After the autoclave was brought to room temperature, the product was recovered, washed with distilled water, filtered and dried at 100° C. The characteristic x-ray diffraction pattern for the product was the same as that shown in Example 3.

EXAMPLE 6

Preparation and Structural Characterization of $RbZn(HPO_4)Cl$ 9.6 g of zinc dichloride was dissolved in 5.9 g of distilled water then 8.1 g of 85% phosphoric acid was added. The solution was stirred thoroughly. Next, 25.2 g of 50% aqeuous rubidium hydroxide was added dropwise (exothermic) to form a reaction mixture having the consistency of a homogeneous gel. The mixture was heated in a polytetrafluoroethylene-lined autoclave for 14 days at 100° C. and a white crystalline solid product formed. After the autoclave was brought to room temperature, the product was recovered, washed with distilled water, filtered, dried at 100° C. The characteristic powder x-ray diffraction pattern for the product is shown in Table 7. The crystalline phase structure was determined by single crystal x-ray diffraction and the crystallographic data in Table 8.

TABLE 7

| 2Theta | d | Integ. I (%) |
|---|---|---|
| 7.1 | 12.44 | 7.5 |
| 9.31 | 9.49 | 5.3 |
| 12.98 | 6.82 | 100 |
| 22.01 | 4.03 | 5.0 |
| 22.56 | 3.94 | 7.3 |
| 22.84 | 3.89 | 11.9 |
| 23.69 | 3.75 | 39.0 |
| 25.17 | 3.54 | 5.9 |
| 26.12 | 3.41 | 5.1 |
| 27.03 | 3.30 | 5.9 |
| 27.70 | 3.22 | 41.4 |
| 28.19 | 3.16 | 19.9 |
| 28.72 | 3.11 | 20.6 |
| 29.47 | 3.03 | 6.4 |
| 29.75 | 3.00 | 8.6 |
| 33.69 | 2.66 | 14.4 |
| 34.40 | 2.61 | 22.2 |
| 35.52 | 2.53 | 7.1 |
| 36.88 | 2.44 | 47.6 |
| 39.33 | 2.29 | 6.1 |
| 39.60 | 2.27 | 5.6 |

TABLE 8

Single Crystal Diffraction Data - $RbZn(HPO_4)Cl$
Crystal System: Orthorhombic, Space Group $Pn2_1a$
(No. 33) a = 15.566Å, b = 14.157Å, c = 5.133Å
alpha = beta = gamma = 90°

| Atom | x | y | z |
|---|---|---|---|
| Rb1 | −0.0045 | 0.1669 | 0.2474 |
| Rb2 | 0.2566 | −0.1808 | −0.2286 |
| Zn1 | 0.1587 | 0.1105 | −0.3026 |
| Zn2 | 0.0914 | −0.1249 | 0.3118 |
| P1 | 0.0112 | −0.0406 | −0.1973 |
| P2 | 0.2377 | 0.0281 | 0.2063 |
| O11 | 0.0450 | 0.0523 | −0.3169 |
| O12 | 0.0478 | −0.1259 | −0.3280 |
| O13 | 0.0207 | −0.0447 | 0.0932 |
| O14 | −0.0911 | −0.0474 | −0.2360 |
| O21 | 0.2072 | −0.0622 | 0.3211 |
| O22 | 0.1989 | 0.1159 | 0.3374 |
| O23 | 0.2286 | 0.0325 | −0.0903 |
| O24 | 0.3389 | 0.0246 | 0.2444 |
| H14 | −0.1043 | −0.0281 | −0.4092 |
| H24 | 0.3502 | 0.0181 | 0.3363 |
| Cl1 | 0.1183 | 0.2626 | −0.2204 |
| Cl2 | 0.1296 | 0.2740 | 0.2417 |

EXAMPLE 7

Preparation and Characterization of Cesium Zinc Arsenate 9.1 g of zinc dichloride was dissolved in 10.0 g of distilled water then 8.6 g of arsenic acid ($H_5As_3O_{10}$) was added. The solution was exposed to mild heating and stirred. After the solution was allowed to cool to room temperature, 19.9 g of 50% aqueous cesium hydroxide was slowly added to form a reaction mixture, Distilled water was added to bring the final weight of the mixture to 50.0 g. The mixture was stirred and developed the consistency of a homogeneous gel formed. The mixture was heated in a polytetrafluoroethylene-lined autoclave for 4 days at 200° C. and a white crystalline solid product formed. After the autoclave was brought to room temperature, the product was recovered, washed with distilled water, filtered and dried at 100° C. The characteristic powder x-ray diffraction pattern for the product is shown in Table 9.

TABLE 9

| 2Theta | d | Integ. I (%) |
|---|---|---|
| 11.18 | 7.91 | 100 |
| 12.54 | 7.06 | 3.0 |
| 20.29 | 4.37 | 6.0 |
| 22.51 | 3.95 | 8.1 |
| 23.28 | 3.82 | 8.1 |
| 23.79 | 3.74 | 9.1 |
| 27.47 | 3.24 | 12.9 |
| 28.29 | 3.15 | 17.4 |
| 29.18 | 3.06 | 3.1 |
| 30.51 | 2.93 | 5.6 |
| 33.11 | 2.70 | 3.0 |
| 33.35 | 2.68 | 3.3 |
| 36.50 | 2.46 | 5.9 |
| 41.52 | 2.17 | 3.5 |

Although the present invention has been described in conjunction with preferred embodiments, it is to be understood that obvious modification and variations of the invention may be resorted to without departing from the spirit and scope of the invention, as those skilled in the art will readily understand. Such variations and modifications apparent to those skilled in the art are considered to be within the purview and scope of the invention and the appended claims.

What is claimed is:

1. A composition of matter comprising an oxide lattice framework consisting essentially of zinc and an oxide selected from the group consisting of phosphorous oxide, arsenic oxides, and mixtures thereof.

2. The composition of claim 1 wherein the framework is charged and the composition includes a charge compensation cation or mixtures thereof selected from the group consisting of H, Li, Na, K, Cs, Tl, Mg, Ca, Sr, Ba, and $R_4X$ wherein X is selected from the group consisting of N, P, As and mixtures thereof and R is selected from the group consisting of H, alkyl groups having from 1 to 8 carbon atoms and mixtures thereof.

3. The composition of claim 2 including a charge compensating anion selected from the group consisting of halides and mixtures thereof.

4. The composition of matter of claim 1 having the formula:

$$[M_d(R_4X)_b]\{[Zn_pO_q][TO_{4-e}(OH)_e]_yL_f\} \cdot gH_2O$$

where M is selected from the group consisting of H, Li, Na, K, Rb, Cs, Tl, Mg, Ca, Sr, Ba, and mixtures thereof; R is selected from the group consisting of H, alkyl groups having about 1 to about 8 carbon atoms, and mixtures thereof; X is selected from the group consisting of N, P, As, and mixtures thereof; T is selected from the group consisting of P, As, and mixtures thereof; L is a halide, and mixtures thereof; a, b, g, q, f are numerical values ranging from 0 to 200; and p and y are numerical values greater than 0 to about 200; and e is a numerical value of from 0 to 4, provided that when M is K and y is 2, e is not $\frac{1}{2}$.

5. The composition of claim 4 wherein a, b, g, q and f are numerical values of from 0 to 25; p is a numerical value of from 1 to 25; and y is a numerical value greater than 0 and up to 25.

6. The composition of claim 5 wherein M is K, and T is P.

7. The composition of claim 5 wherein M is Rb and T is P.

8. The composition of claim 5 wherein M is Cs and T is As.

9. The composition of claim 6 wherein b, g, q, e, and f are 0; and, a, p and y are 1.

10. The composition of claim 5 wherein a, b, q, e and f is 0; p is 3 and y is 2.

11. The composition of claim 7 wherein a is 1; b, q, f, and g are 0; e is $\frac{1}{2}$ and y is 2.

12. The composition of claim 7 wherein a, p, e, f and y are 1; b and q are 0 and L is chloride.

13. The composition of claim 8 wherein p and y are 1; b, q, e and f are 0.

14. A method for preparing a composition of matter comprising an oxide lattice framework consisting essentially of zinc and an oxide selected from the group consisting of phosphorous oxides, arsenic oxides and mixtures thereof comprising:

forming an aqueous solution of a zinc salt, an acid selected from the group consisting of phosphorous acid, arsenic acid and mixtures thereof, and an agent selected from the group consisting of mineralizing and templating agents; and heating the aqueous solution, under autogeneous pressure, at temperatures ranging from about 50° C. to about 200° C. for a time sufficient to form the composition of the matter.

15. The method of claim 14 wherein said time ranges from about 1 hour to about 30 days.

16. The method of claim 15 wherein the agent is a mineralizing agent.

17. The method of claim 16 wherein the mineralizing agent is selected from the group consisting of alkali, and alkaline earth halides, hydroxides and mixtures thereof.

18. The method of claim 15 wherein the agent is a templating agent.

19. The method of claim 18 wherein the templating agent is selected from ammonium salts, organic amines, organic ammonium salts, phosphonium and arsonium.

* * * * *